United States Patent Office
3,605,812
Patented Sept. 20, 1971

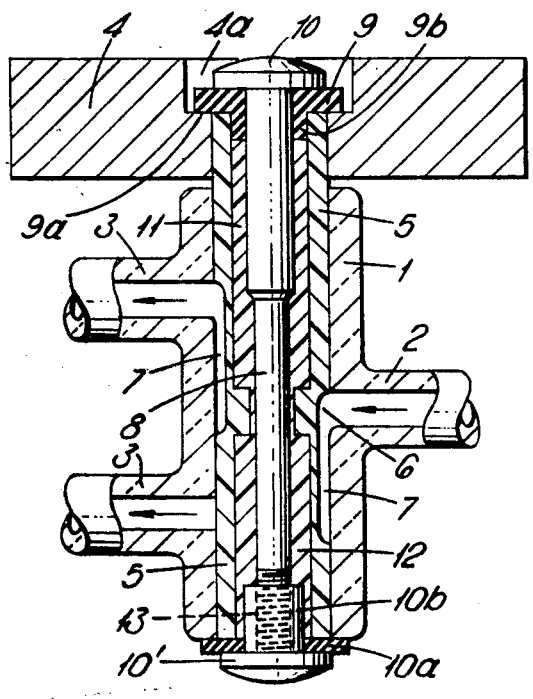
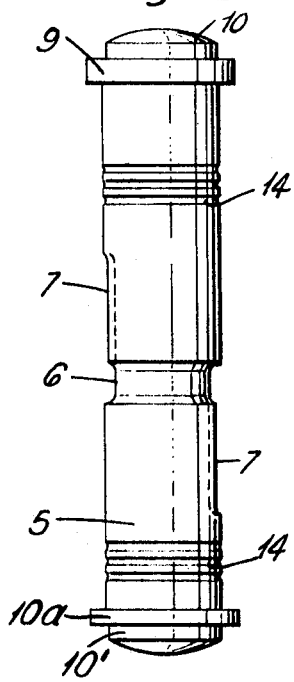
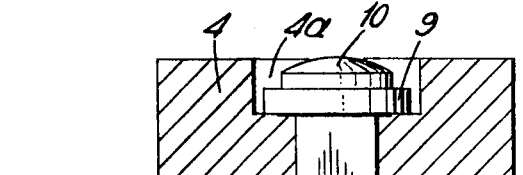

3,605,812
MULTIPLE WAY STOPCOCKS
Wilhelm Anton Richter, deceased, late of Staffordshire, England, by Hilda Rosina Richter, executrix, Staffordshire, England, assignor to Quickfit & Quartz Limited, Walton, Stone, England
Filed Sept. 29, 1969, Ser. No. 870,593
Claims priority, application Great Britain, Oct. 16, 1968, 49,040/68
Int. Cl. F16h *11/02*
U.S. Cl. 137—627.5                    11 Claims

ABSTRACT OF THE DISCLOSURE

A cock comprising a body with inlet and outlet ports, a bore through the body having an obturating assembly slidable therein, either rotatably or longitudinally, the obturating assembly having a liner, a clamping device within and spaced from the liner, an elastomer e.g. polytetrafluoroethylene filling the space, glands and a device operable to vary the length of the clamping device with the glands engaging the ends of the elastomer filling to vary the radial pressure of the liner against the walls of the body bore, and grooving in the liner to provide for fluid flow between the inlet and the outlet ports.

BACKGROUND OF THE INVENTION

(1) Field of the invention

This invention relates to stopcocks or the like such as valves or faucets particularly for use in fluid pipe lines where fluid paths from an inlet or inlets to one or more outlets are established or cut off, such as in flow paths for corrosive fluids, in which the cock parts which come in contact with the fluids are inert to the fluids.

(2) Description of the prior art

In known cocks and the like, particularly those employed in flow paths for corrosive fluids, a main difficulty is to provide a satisfactory efficient seal so that corrosive fluid does not escape from the cock or leak through the cock from the inlet to the outlet side when the cock is in the fully shut off position.

Hitherto such cocks having a hollow body with inlet and outlet parts and a moveable element which establishes a flow path through the cock or shuts off the flow path, have included sealing glands between the body and the moveable element, and to prevent leakage of fluid from the inlet to the outlet side when the cock is in the shut off position it has been necessary to employ precision made parts which provide an adequate seal between the moveable part and the body, so that such cocks have been expensive to manufacture and to maintain in a satisfactory workable state over a substantial period of useable life.

The main object of the present invention is to provide a stopcock or the like in which the aforesaid disadvantages are minimised or eliminated and which will be inexpensive to manufacture while having a satisfactory working life.

SUMMARY

According to the present invention a cock or the like comprises a cock body having a cylindrical bore therethrough with spaced inlet and outlet ports extending through the cylinder wall for connection to external ducts, an obturating assembly moveably disposed in the bore and a control element operatively connected to the moveable obturating assembly, the obturating assembly having a hollow liner of self lubricating material disposed in the bore in sliding engagement with the cylindrical surface of the bore and with said surface providing passages which in the flow position establish a fluid flow path between the ports, a clamping device of variable length extending through and spaced from the liner, actuating means operable to vary the length of the clamping device, and the space between the liner and the clamping device being filled with a deformation elastomeric material compressible by the actuating means to vary the pressure between the outer surface of the liner and the wall of the cylindrical bore whereby a fluid-tight seal is provided in all positions of the moveable assembly.

Preferably the liner is made of polytetrafluoroethylene which exhibits a low coefficient of friction when slid over another surface of material such as glass or metal and is inert to a very wide range of corrosive fluids such as acids or caustic substances.

In a preferred construction the liner is grooved externally longitudinally and/or circumferentially and/or obliquely so that in the flow position the groove or grooves provide one or more flow paths between the inlet and outlet ports.

The actuating means preferably comprises, at one or both ends of the clamping device, an element which can be telescoped along the device with means to retain it in the adjusted position, and may include a gland which engages the end or ends of the elastomer. The glands or one of them may have a portion which is shaped to enter the contiguous end or ends of the liner and abut the elastomer within the liner.

BRIEF DESCRIPTION OF THE DRAWINGS

FIG. 1 is a vertical cross-section through a cock;
FIG. 2 is a side view of the obturating assembly in the cock shown in FIG. 1, and
FIG. 3 is a vertical cross-section similar to FIG. 1 but showing an alternative construction.

In the drawings like references are used to designate the same or similar parts.

DESCRIPTION OF THE PREFERRED EMBODIMENTS

Referring to FIGS. 1 and 2, the cock has a body 1, shown of tubular construction, but the essential part is the cylindrical bore which is preferably precision formed and/or polished to ensure a satisfactory seal with the obturating member to be described. The exterior of the body part may be of any desired contour. The body 1 is preferably made of glass but it may be made of plastic material inert to the fluids coming in contact with it in use or it may be metal where the metal will not be attacked in use.

The body 1 has an inlet port 2 connectable to a supply pipe and is located mid-way of the length of the body 1, and has two outlet ports 3 connected to branch pipes, or a number of such outlet ports or only one outlet port may be provided, the actuating assembly to be described being appropriately fashioned to suit the number of inlet ports and outlet ports used. The situation of the inlet and outlet ports need not be as shown in the drawings but may be arranged at any particular point along the length of the body 1 and at any angular spacing therearound.

Within the body 1 is an actuating assembly having a portion which extends at the top of the body 1 in FIG. 1 out of the body and has secured thereto a knob 4 for operation of the assembly.

The assembly comprises a liner 5 in the form of a sleeve of substantially frictionless or self-lubricating material such as polytetrafluoroethylene which is inert to the fluids which in use will flow through the cock.

The liner 5 is hollow throughout its length and passing therethrough and spaced therefrom but coaxially therewith is a clamping element 8 having a head 10 at the upper end and a threaded shank 13 at the lower end on which is screw-threaded a head 10' having a shank 10b internally threaded, so that by rotation of the head 10' while the element 8 is remained stationary the effective length of the element 8 can be adjusted for the purpose to be described.

The space between the element 8 and the liner 5 is filled by an elastomer 11, 12 which is preferably inserted by pouring it in in liquid form and allowing it to set so that it intimately surrounds the element 8 and is in intimate contact with the inner surface of the hollow liner 5. The elastomer is admitted in liquid form into the said space preferably before the element 8 is introduced thereinto, an expert operator knowing the amount of elastomer to be employed so that when axial pressure is applied to the elastomer in the space as will be described, the elastomer will exert a radial pressure inside the liner thereby increasing the radial pressure between the liner and the surface of the bore in the body 1.

The elastomer may be inserted as a liquid or it may be inserted as a preformed element and in the case of its insertion as a liquid it may in fact be inserted as two reactants, one of which or both of which is a liquid which reacts to form the elastomer in situ.

By using the liquid form of the elastomer in erecting the actuating assembly damage to the liner is minimised or eliminated during the erecting operation, and the difficulties of building up a tubular elastomer to fill the cavity between the liner 5 and the element 8 is eliminated.

Experiments have shown that elastomers suitable for this purpose are those available on the open market under the registered trademark "Silcoset" and "Silastic."

At the top end of the body 1, the element 8 with its head 10 extends above the liner 5 and the gap between them is filled by an upper gland 9 having a tubular shank 9b surrounding the element 8 with the shank extending within the liner and in engagement with the upper end of the elastomer 11. Mounted on the upper end of the liner 5 is a control element 4 such as a knob which has a recess 4a in which the gland 9 and the head 10 are preferably located. Thus by turning the control element 4 the whole of the assembly made up of the liner, the elastomer and the element 8 can be rotated as a unit.

At the lower end of the liner 5 an annular gland 10a surrounds the end of the element 8 with an annular gap between them, so that the flange 10b of the lower head 10' can pass through the gland and be screwed on to the thread 13 at the bottom of the element 8.

It will be seen that by relatively rotating the element 8 and head 10' not only will the glands 9 and 10a be compressed but also the elastomer will be compressed within the liner and since the element 8 is of substantially rigid material the axial pressure on the elastomer will force it to expand radially outwards. The liner 5 shown in FIG. 1 preferably has about its mid point an internal annular projection or radial projections which divide the major thickness of the elastomer into upper and lower portions 11 and 12 at opposite ends of the space separated or interrupted by the flanges or projections. Where it is necessary for grooves to be formed round the liner, these grooves may be formed in the projections and a number of such projections for such grooves may be provided over the length of the liner.

As shown in FIG. 1, the gland 9 extends radially over the end not only of the elastomer 11 which is essential but also across the end of the liner which is preferable but not essential. The lower head preferably has a diameter which may be the same as or less than the gland 10a but extends not only across the elastomer 12 but also across at least a part of the end of the liner 5.

The liner 5 is grooved externally as seen at 6 in FIG. 2 so that the inlet port 2 is in permanent communication with the groove 6. Extending longitudinally or otherwise, e.g. spirally, along the outside of the liner 5 are grooves 7 emanating at one end from the groove 6 and at the other end when in the appropriate position registering with the outlet ports 3. In FIG. 1, two such grooves 7 are shown, one for each of the ports 3 but where other additional ports are provided additional grooves will of course be provided in order that by different settings angularly of the actuating assembly with respect to the body 1 flow paths from the inlet port or ports to selected outlet port or ports can be established. Further rotation of the actuating assembly will of course obturate the outlet ports or one of them by the appropriate grooves 7 moving round the cylindrical wall of the bore in the body 1 to the point where the liner 5 seals the outlet port or ports.

In FIG. 1 the cock is shown with the actuating assembly set for a fluid to enter through the inlet port 2, pass round the groove 6 and up the upper groove 7 to the upper outlet port 3.

In the portion of the body 1 above the upper outlet port 3 and below the lower outlet port 3, the liner may be provided with a number of annular grooves defining ribs 14 or indeed grooves of any configuration round the liner on its outer surface which assists in providing a seal between the body 1 and the ends of the liner 5 since when the elastomer in the space between the liner and the element 8 is compressed axially the weakened portion of the liner will yield under the pressure of the elastomer and cause distortion of the ribs between the grooves thus increasing the seal between the liner and the cylindrical bore of the body 1.

By virtue of the uniform pressure throughout the length of the elastomer effected by shortening the axial length of the element 8 as aforesaid creeping of the liner is prevented by the flanges 9 and 10a and the uniform radial pressure is applied round the bore of the body 1.

By means of the aforesaid construction the liner of polytetrafluoroethylene is protected against damage when it is inserted into the bore of the body 1 and during its use. At the same time a satisfactory seal is effected at all times between the surfaces of the liner which engage the inner cylindrical surface of the bore in the body 1.

Referring to FIG. 3, the cock assembly is similar to that shown in FIG. 1, the obturating member being similar to that shown in FIG. 2 save that two grooves 6 and 6a axially spaced along the liner 5 are provided therearound. The axial distance between the centre line of the inlet port 2 and each of the outlet ports 3 is equal and each is equal to the distance between the centres of the two grooves 6 and 6a, the assembly being axially moveable through the bore in the body 1 so that it may be in the position shown in FIG. 3 where the fluid enters the inlet port 2, passes round the grooves 6, up the groove 7 and out of the outlet port 3. When the assembly is pressed upwardly until the flange 10a engages the bottom of the body 1, the fluid enters the port 2 round the groove 6a, down the lower groove 7 and out of the lower outlet port 3. It will be understood that any variations of grooves and ports can be arranged to suit the number of supply lines and branch lines with which the valve is to be operated. Moreover a variable number of positions both angularly and longitudinally of the actuating assembly is possible to provide the flow paths required or completely to obturate the flow of liquid from the grooves 6 or 6a.

The present invention embraces not only the cock using the actuating assembly but also the actuating assembly itself.

We claim:

1. A cock comprising a cock body having a cylindrical bore therethrough with spaced inlet and outlet ports extending through the cylinder wall for connection to external ducts, an obturating assembly moveably disposed in the bore and a control element operatively connected to the moveable obturating assembly, the obturating assembly including a hollow liner of self lubricating material disposed in the bore in sliding engagement with the cylindrical surface of the bore and with said surface providing passageways which in the flow position establish a fluid flow path between the ports, at least the end portions of said liner beyond said ports being expansible, a clamping device of variable length extending through and spaced from the inner surface of the liner and including actuating means operable to vary the length of the clamping device, and a deformable elastomeric material completely filling the space between the liner and the clamping device and being compressible by said clamping device and actuating means to expand at least said end portions of said liner to vary the pressure between the outer surface of the liner and the wall of the cylindrical bore, whereby a fluid-tight seal is provided in all positions of the moveable assembly.

2. A cock according to claim 1, wherein the liner is made of polytetrafluoroethylene and the body is of glass with a polished bore.

3. A cock according to claim 1, wherein the liner is grooved externally with at least one longitudinal, circumferential and oblique groove so that in the flow position the grooving provides at least one flow path between the inlet and outlet ports.

4. A cock according to claim 1, wherein said actuating means comprises at least at one end of the clamping device, an element which can be telescoped along the device with means to retain it in the adjusted position, and includes a gland which engages at least one end of the elastomer.

5. A cock according to claim 4, comprising a second gland at the other end of said clamping device, at least one of the glands having a portion shaped to enter at least one contiguous end of the liner and abut the elastomer within the liner.

6. A cock according to claim 5, wherein the glands overlap the ends of the liner whereby relative axial movement between the liner, elastomer and clamping device is inhibited.

7. A cock according to claim 1, wherein said control element operable from outside the cock is operatively connected to the liner.

8. A cock according to claim 1, wherein the elastomer is formed in situ.

9. A cock according to claim 1, wherein the liner has circumferential grooves defining ribs therearound for sealing against the wall of the bore in the cock body.

10. A cock according to claim 1, wherein said passageways comprise at least one groove in the outer surface of said liner, said liner having internal reinforcing portions backing said groove and precluding expansion of the liner in the area of the groove.

11. An obturating assembly to be moveably disposed in a cylindrical bore of a cock body having spaced inlet and outlet ports in communication with the bore, said obturating assembly comprising a hollow liner of self lubricating polytetrafluoroethylene material to be disposed in sliding engagement within the cylindrical surface of the bore, said liner having passageways in its outer surface and which in the flow position establish a fluid flow path between the ports, at least the end portions of said liner being expansible, a clamping device of variable length extending through and spaced from the inner surface of the liner and including actuating means operable to vary the length of the clamping device, and a deformable elastomeric material completely filling the space between the liner and the clamping device and being compressible by said clamping device and actuating means to expand at least said end portions of said liner to vary the pressure between the outer surface of the liner and the wall of the cylindrical bore.

References Cited

UNITED STATES PATENTS

| | | | |
|---|---|---|---|
| 3,095,904 | 7/1963 | Thaning | 251—191X |
| 3,142,474 | 7/1964 | Nelson | 251—309 |
| 3,305,211 | 2/1967 | Phillips | 251—309 |
| 3,399,863 | 9/1968 | Fawkes | 251—306 |

HAROLD W. WEAKLEY, Primary Examiner

U.S. Cl. X.R.

251—309, 310, 324